March 27, 1962 — R. P. HAGUE — 3,027,171
HOBBY-HORSE
Filed Oct. 4, 1960 — 3 Sheets-Sheet 1

INVENTOR.
Rudolph P. Hague
BY Ezekiel Wolf, Wolf & Greenfield
atty

March 27, 1962 R. P. HAGUE 3,027,171
HOBBY-HORSE
Filed Oct. 4, 1960 3 Sheets-Sheet 2
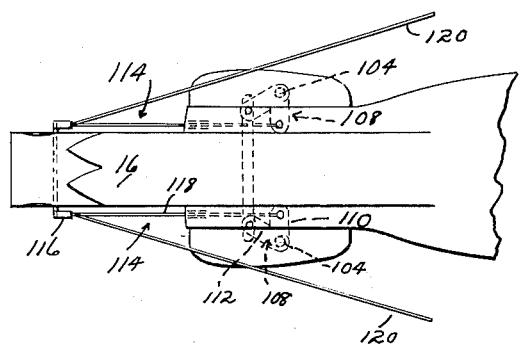
Fig. 7
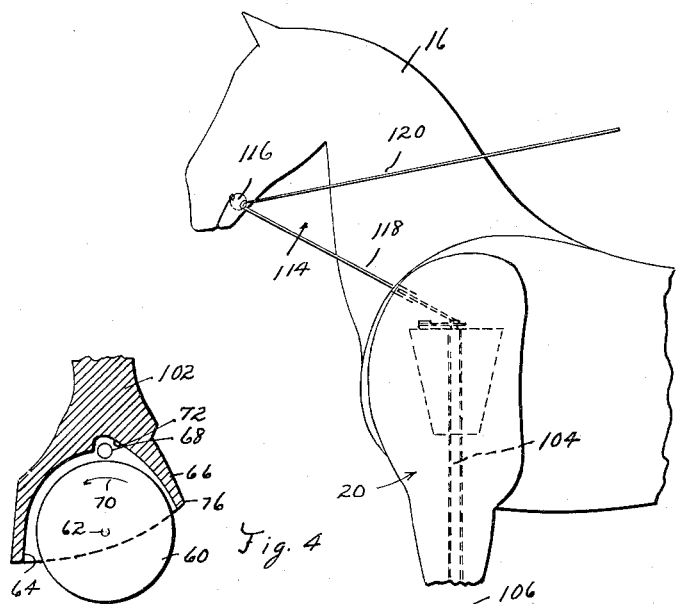
Fig. 6
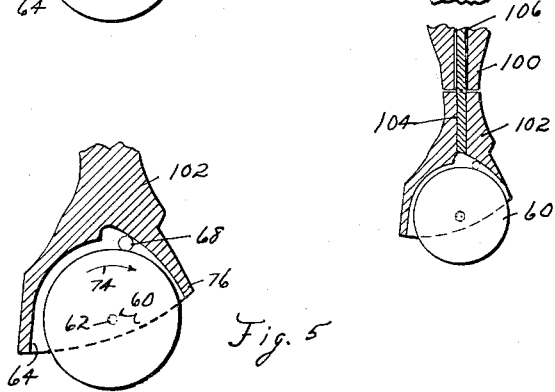
Fig. 4
Fig. 5
INVENTOR.
Rudolph P. Hague
BY
Ezekiel Wolf, Wolf · Greenfield
att'y March 27, 1962   R. P. HAGUE   3,027,171
HOBBY-HORSE
Filed Oct. 4, 1960   3 Sheets-Sheet 3

INVENTOR.
Rudolph P. Hague
BY
Ezekiel Wolf, Wolf & Greenfield
a'Ty

United States Patent Office 3,027,171
Patented Mar. 27, 1962

1

3,027,171
HOBBY-HORSE
Rudolph P. Hague, 21 Mallon Road, Dorchester, Mass.
Filed Oct. 4, 1960, Ser. No. 60,366
10 Claims. (Cl. 280—1.183)

This invention relates to hobby-horses and more particularly comprises an improvement over the hobby-horse disclosed in prior U.S. Patent No. 1,708,090 issued April 9, 1929, to Alexander C. P. Hague.

Patent No. 1,708,090 discloses a hobby-horse which moves under power imparted by the rider. My invention improves the operation of the earlier structure by insuring smoother progress of the hobby-horse as it is actuated by the rider. My invention also increases the stability of the hobby-horse and permits the rider to exercise more precise control over it as the hobby-horse progresses. In addition, my invention includes a new hoof action for the hobby-horse and provides means for steering it.

My invention will be best understood and appreciated from the following detailed description read in connection with the accompanying drawings, in which:

FIGURES 4 and 5 are enlarged cross sectional views of a hoof showing the effects of rotation of the hoof wheel in different directions;

FIGURE 6 is a fragmentary side elevation of a hobby-horse illustrating one form of steering mechanism;

FIGURE 7 is a plan view of the hobby-horse shown in FIGURE 6;

Figure 1:
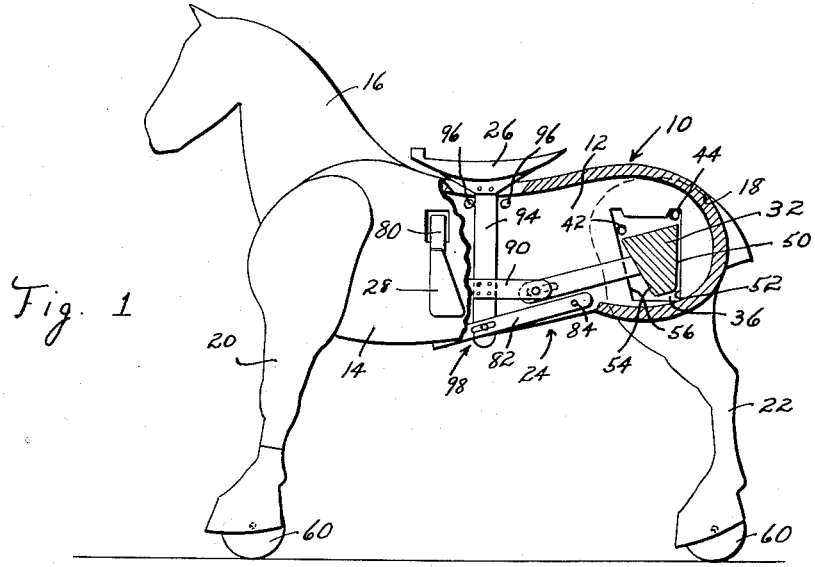
FIGURE 1 is a side elevation partly in section of a hobby-horse constructed in accordance with my invention.
Figure 2:
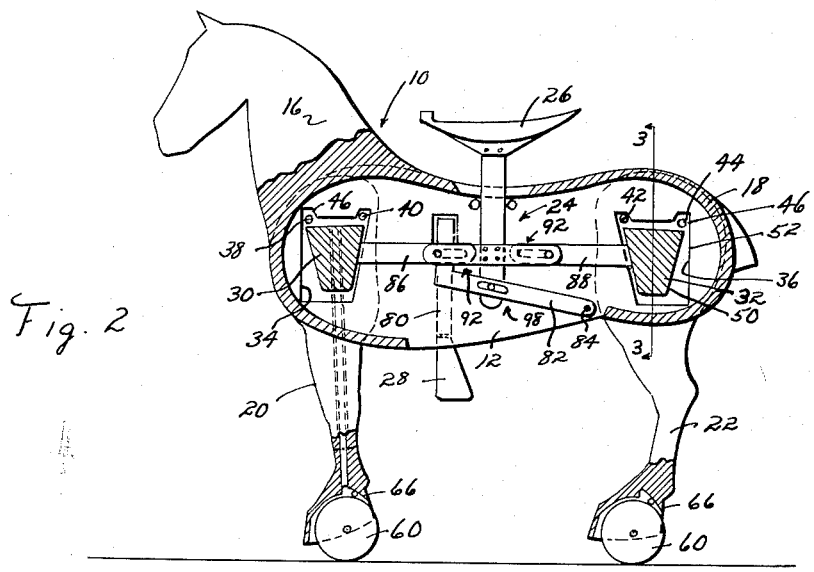
FIGURE 2 is a side elevation partly in section of the hobby-horse shown in FIGURE 1 but with certain parts in a different position.

The hobby-horse shown in FIGURES 1 and 2 includes a body 10 composed of parallel vertical sides 12 and 14, a front member 16 which includes the head, a rear member 18 which includes the tail, and a pair of front legs 20 and a pair of rear legs 22 (one each shown in FIGURES 1 and 2).

The parts 12, 14, 16 and 18 which comprise the major body section are immovable except as they move together in fixed relationship to one another as the hobby-horse progresses. The legs 20 and 22, however, are movable relative to one another and to the other parts of the body and these legs actually facilitate progress of the horse along a prescribed path. Motion is imparted to the legs 20 and 22 by means of an actuating mechanism 24 contained in part within the body and which includes a saddle 26 to be occupied by the rider and stirrups 28 for the rider's feet. The manner in which the actuating mechanism 24 causes the horse to progress will be defined in detail below.

The front legs 20 are interconnected by a horizontal rocker member 30 and the rear legs 22 are similarly interconnected by a rocker member 32. The members 30 and 32 may or may not be integrally formed with the legs but in any case are rigidly secured to them. If the parts of the hobby-horse are molded of plastic or similar material it may prove both economical and structurally sound to form the rocker members as integral parts of the leg assembly while if the hobby-horse is made of wood, it undoubtedly would be necessary that the members be made as separate parts and screwed to the opposite legs or be secured thereto by similar types of fasteners.

The rocker members 30 and 32 extend through openings 34 and 36 provided in the side members 12 and 14 of the body of the horse and cooperate with the openings to limit the forward and rearward movement of the legs with respect to the body. The openings 34 formed in the side members 12 and 14 adjacent the head of the horse at the shoulder limit the movement of the rocker member 30 while the openings 36 formed at the hip limit the movement of the member 32. While the rocker members 30 and 32 cooperate with the openings 34 and 36 to limit the amount of movement of the legs, unlike the hobby-horse disclosed in earlier Patent No. 1,708,090, the rocker members do not support the body parts 12, 14, 16 and 18 on the legs. Rather, rods 38 and 40 serve to support the body on the front legs 20 while rods 42 and 44 similarly support the body on the rear legs 22. The several rods 38, 40, 42 and 44 extend between the pairs of front and rear legs parallel to the rocker members but are spaced a short distance above them. The rods also extend through the openings 34 and 36 formed in the side members. It will be noted particularly in FIGURES 1 and 2 that the upper corners of the openings 34 and 36 are enlarged or notched as suggested at 46 to receive the rods 38, 40, 42 and 44.

Figure 3:
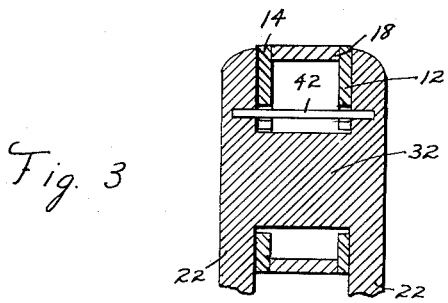
FIGURE 3 is a cross sectional view taken along the corresponding section line in FIGURE 2.

I will now describe the manner in which the rear legs 22 move relative to the body 10. This description made with reference to FIGURES 1-3, will also serve to describe the manner in which the front legs 20 move relative to the body, as the actions of the pairs of legs are identical. The rods 42 and 44 which bridge the space between the rear legs 22 are spaced apart a distance equal to the space between the notches 46 formed at the upper corners of the openings 36 in the side members 12 and 14. When the legs 22 are in the position shown in FIGURE 1, the rod 44 lies within the notches 46 at the upper rear corners of the openings 36 and provides vertical support for the body 10. In the position shown in FIGURE 1, the legs 22 are prevented from moving rearwardly beyond the position shown relative to the body by the cooperation of the surface 50 of the rocker member 32 and the rear edges 52 of the openings 36. As the rocker member 32 cannot pass between or beyond the edges 52 of the openings, the legs 22 may not assume a greater incline to the vertical. Under the influence of the actuating mechanism 24 to be described below, the legs 22 may be moved from the position shown in FIGURE 1 to that shown in FIGURE 2. In FIGURE 2 it will be noted that the rod 42 lies within and engages the upper surface of the notches 46 formed at the front edges of the openings 36 in the side members 12 and 14 and that the rod 42 thus serves to support the body 10 on the rear legs. Forward movement of the legs 22 relative to the body is limited by the forward surface 54 of the rocker member 32 and the front edges 56 of the openings 36 in the side members. In the forward position of the legs 22, the surface 54 bears against the edges 56 as shown in FIGURE 2. From the foregoing description, the reader will appreciate that the front legs 20 move forwardly and rearwardly in the same manner as the rear legs 22.

Each of the four legs 20 and 22 are provided with wheels 60 supported on shafts 62 which extend between the sides of cavities 64 provided in the hoofs 66 at the lower end of the legs. These parts are shown in detail in FIGURES 4 and 5. Disposed in the cavities 64 above the wheels 60 are rollers 68 which serve as stops to prevent appreciable clockwise rotation of the wheels 60 (as shown in FIGURES 4 and 5) and therefore prevent the legs 20 and 22 from moving backwards on the supporting surface of the hobby-horse. When the wheels 60 turns in a counter clockwise direction as suggested by the arrows 70 in FIGURE 4, the roller 68 lies within the enlarged portion 72 of the cavity 64 and does not interfere with continued rotation of the wheel 60. However, when the wheel 60 turns clockwise as suggested by the arrow 74 in FIGURE 5, the roller 68 moves out of the enlarged portion 72 of the cavity 64 and wedges itself between the periphery of the wheel 60 and the rear wall 76 of the hoof, which prevents further clockwise rotation of the wheel. This action of the rollers 68 which are provided in each of the four hoof assemblies or some similar action is essential if the horse is to progress. Nevertheless, the simple arrangement shown in FIGURES 4 and 5 has proved most successful and economical.

The actuating mechanism 24 as stated above, includes a saddle 26 to be occupied by the rider and stirrups 28 for the rider's feet. The stirrups 28 which are disposed on the outside of each of the vertical side members 12 and 14 of the body 10 are attached to the ends of straps 80 which extend upwardly on the outside of the side walls 12 and 14 and downwardly within the body wherein their other ends are secured to the free ends of lever 82. Lever 82 is supported for pivotal movement about a fulcrum 84 and is raised to the position shown in FIGURE 2 when the stirrups 28 are moved downwardly to their lowermost position. The weight of the rider on the stirrups 28 pulls the straps 80 downwardly on the outside of the body and raises the other ends of the straps in the body to effect this action.

Extending from each of the rocker members 30 and 32 toward the center of the body are arms 86 and 88, and the adjacent ends of the arms are interconnected by a connecting rod 90. The ends of the connecting rod 90 are secured to the ends of the arms 86 and 88 by pin and slot connections generally designated by numeral 92. The connecting rod 90 is secured intermediate its ends to a push rod 94 that supports the saddle 26. The push rod 94 is limited to vertical motion and is guided by pins 96. The lower end of the push rod 84 is fastened by means of pin and slot connection 98 to the central portion of the lever 82.

From the foregoing description of the details of the actuating mechanism 24, the reader will appreciate that when the rider of the hobby-horse transfers his weight from the saddle 26 to the stirrups 28, the actuating mechanism 24 will move from the position shown in FIGURE 1 to that shown in FIGURE 2. The stirrups will move to their lowermost position and this action will cause the lever 82 to pivot in a clockwise direction about its fulcrum 84 which in turn will move the push rod 94 and saddle 26 upwardly and the push rod 96 will carry the connecting rod 90 with it. The upward movement of the connecting rod 90 will cause the arms 86 and 88 to rise and the weight of the body 10 will be transferred from the rods 38 and 44 which interconnects the front and rear legs respectively to the other rods 40 and 42. Thus, the legs will be moved toward one another from the position shown in FIGURE 1 to that shown in FIGURE 2 and their movement will be limited by the forward face 54 of the rocker member 32 and the cooperating edges 56 of the openings 36 and the rear face and edges of the rocker member 30 and the openings 34.

Although it appears that when the actuating mechanism 24 moves the front legs 20 from the position shown in FIGURE 1 to that shown in FIGURE 2 that the legs move rearwardly with respect to the body 10, the wheels 60 in the hoofs cannot turn to permit the legs to move in a rearward direction on the supporting surface. The wheels which support the rear legs 22 will freely move forward, that is, the wheels may freely turn in a counter clockwise direction so as to cause the legs to move on the surface in a forward direction with respect to the horse's body. As a result, the action of moving the legs from the position shown in FIGURE 1 to that shown in FIGURE 2 will cause the forward legs 20 to remain fixed on the supporting surface while the rear legs will move forward a distance equal to the difference between the separation of the legs shown in FIGURE 1 and that shown in FIGURE 2.

To continue the forward progress of the horse, the rider will transfer his weight from the stirrups 28 to the saddle 26. The effects of the downward movement of the push rod 94 may be traced readily in the drawings and the legs will again separate to assume the position shown in FIGURE 1. Because the rear legs may not move rearwardly on their supporting surface, they will remain fixed and the legs 20 will move forward a distance equal to the difference between the separation of the legs in FIGURES 1 and 2. It will thus be appreciated that as the rider alternately transfers his weight from the saddle to the stirrups and back to the saddle, the hobby-horse will progress.

In FIGURES 6-9, two assemblies for steering the horse are shown. The assembly shown in FIGURES 6 and 7 is somewhat more realistic in appearance but is also somewhat more complex than that shown in FIGURES 8 and 9. In FIGURE 6 it will be noted that the leg 20 is formed in two distinct parts 100 and 102 joined preferably between the knee and the hoof. A shaft 104 is rigidly secured to the lower part 102 of the leg and extends through an opening 106 formed in the upper portion 100 of the leg 20. Rotation of the shaft 104 causes the lower part 102 of the leg to turn relative to the upper part 100 as the shaft turns freely within the upper part 100.

Secured to the upper end of shaft 104 is a V-shaped lever 108 having diverging legs 110 and 112. It will be noted in FIGURE 7 that the crotch of the lever is secured to the upper end of shaft 104. The end of leg 110 is secured to one end of rein 114 which extends forwardly about a pulley 116 which simulates a bit in the mouth of the horse, and then rearwardly to the position of the rider. Thus, the portion 118 of the rein 114 extends from the end of lever arm 110 to the pulley 116 while the portion 120 extends from the pulley 116 to the hands of the rider. The rod, lever and pulley assembly described in connection with one of the front legs 20 is duplicated as a mirror image thereof in the other front leg. Thus it will be noted in FIGURE 7 that the rod 104, the lever 108 and the pulley 114 is duplicated on each side of the head 16 of the horse. The two systems are interconnected by means of a tie rod 122 which is secured to the ends of the legs 112.

From the foregoing description, it will be recognized that when the rider pulls the left rein 114, that is, the portion 120, the V-shaped lever 108 mounted on the top of rod 104 in the left leg will turn counter clockwise as shown in FIGURE 7 and cause the lower portion 102 of the leg to turn the same direction. The tie rod 122 will similarly cause the other forward leg of the horse to turn and, therefore, movement of the horse in response to actuation of the saddle and stirrups by the rider will cause the horse to move forward and to the left. If the rider desires to turn to the right, he need only pull the other rein, that is, the rein directly connected to the mechanism of the right leg. This action will cause the V-shaped lever 108 attached to the upper part of the rod in the right leg to turn in a clockwise direction as viewed in FIGURE 7, and the tie rod 122 will cause the same action to take place in the left leg. It will be appreciated that the arrangement of the reins through the pulleys 116 which in fact simulates the ordinary horse bit gives a very authentic appearance to the steering mechanism. To provide greater support for the youngster on the hobby horse, the ends of the portions 120 of the reins may be connected to the ends of a handle pivotally supported above the head or neck of the animal. Such a handle mounted for pivotal movement about a vertical axis would provide a steady grip for the youngster and the youngster could steer the horse by turning the handle about the vertical axis.

Figure 9:
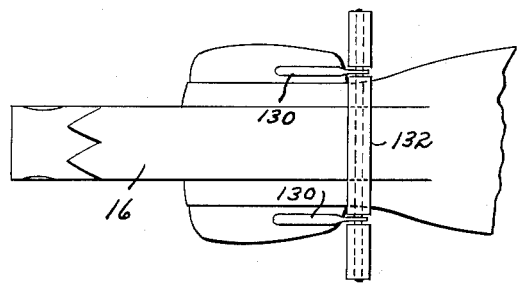
FIGURE 9 is a plan view of the hobby-horse shown in FIGURE 8.
Figure 8:
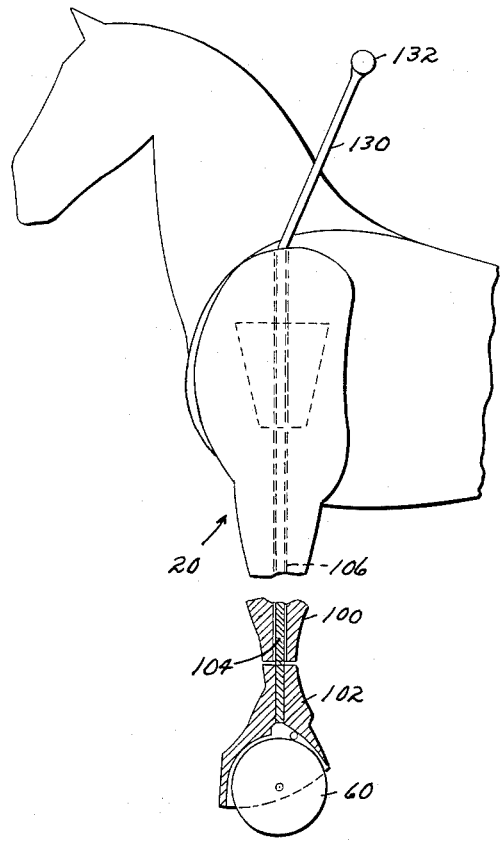
FIGURE 8 is a fragmentary side elevation of a hobby-horse showing another form of steering mechanism.

In FIGURES 8 and 9, the mechanism provided is much simpler than that shown in FIGURE 7 and will be understood with a very brief description. In FIGURE 8 it will be noted that the forward leg 20 is split into upper and lower parts 100 and 102 and a rod 104 is firmly tied to the roller section 102 and passes through an enlarged opening 106 formed in the upper section just as in the other embodiments. In this embodiment, the reins and levers are replaced by rods 130 which may or may not be integrally formed as an extension of the rods 104. The rods 130 extend upwardly from the top of the leg 20 and are tied together by the handle 132. With this simple arrangement, the rider merely shifts the handle to the left or to the right to effect the steering. If the child desires to move or steer the horse so that it moves forwardly to the left, he will shift the handle 132 to the right which will turn the rods 104 extending downwardly through the legs counter clockwise so that the lower portions of the legs 102 will turn somewhat in a left direction. The arrangement shown in FIGURES 8 and 9 lends more support to the rider and is preferred for hobby-horses made in smaller sizes for the smallest youngsters.

From the foregoing description it will be appreciated that the improvements embodied in this hobby-horse provide considerable advantages over the similar parts of the hobby-horse shown in Patent No. 1,708,090. The rods 38, 40, 42 and 44 which tie the legs together and support the body 10 facilitate the smooth shifting of fulcrums of the legs when they move from one position to the other. Because the notches 46 provided in the upper corners of the openings 34 and 36 control and hold the rods, no opportunity is provided for wobbling of the legs or shifting of the rods in the openings in either a forward or a rearward direction which would adversely effect the stability of the hobby-horse. Complete control is exercised over the rods by means of the notches, and the mating surfaces of the rocker members and openings 34 and 36 in the side members 12 and 14 remain firmly against one another. Furthermore, by providing a steering mechanism for the hobby-horse, a child may derive considerably more enjoyment from its use. The hobby-horse will hold the child's attention for much greater periods because it is no longer confined to travel along a straight line.

From the foregoing description numerous modifications will undoubtedly occur to those skilled in the art. For example, some advantage may be derived by providing a sleeve about the rods 38, 40, 42 and 44 so as to enhance the smoothness of the roller bearing action of each leg about the different fulcrums. The incorporation of sleeves about the rods is deemed to be within the scope of this invention. Because such changes suggest themselves, I do not intend to limit the breadth of my invention to the specific embodiments illustrated and described. Rather, it is my intention that the breadth of my invention be determined by the appended claims and their equivalents.

What is claimed is:

1. A hobby-horse comprising a body, pairs of front and rear legs for the body, a pair of parallel horizontal rods interconnecting the front legs adjacent their top and a second pair of parallel horizontal rods similarly interconnecting the rear legs, openings in the body through which the parallel rods extend, each of said rods serving as fulcrums for pivotal movement of the front and rear pairs of legs toward and away from each other, means forming part of the openings for retaining the axes of the rods in fixed position when each serves as a fulcrum for pivotal movement of the legs, and actuating means disposed in the body for pivoting said legs about their fulcrums and changing the fulcrums from one rod to another.

2. A hobby-horse as defined in claim 1 further characterized by means interconnecting the legs of each pair and extending through the openings, said means cooperating with the openings to limit the extent of the pivotal movement permitted for each of the front and rear pair of legs.

3. A hobby-horse as described in claim 1 further characterized by wheels supporting each of the legs on a surface over which the hobby-horse is to progress, and means engaging the wheels preventing the legs from moving rearwardly on the surface.

4. A hobby-horse as defined in claim 2 further characterized by the forward legs of the horse being composed of separate upper and lower parts, and means for turning the lower part of each of the forward legs relative to the upper part to vary the direction of progress of the horse on a supporting surface.

5. A hobby-horse as defined in claim 4 further characterized by the last means for turning including shafts secured to the lower parts of the front legs and extending upwardly through the upper parts of the legs, and a lever mechanism interconnecting the tops of the shafts for turning said shafts in tandem.

6. A hobby-horse as defined in claim 5 wherein the lever mechanism includes a lever secured to the top of each shaft, a tie rod interconnecting the two levers, and reins connected to the levers for directly actuating either of said levers to turn one of said shafts, said tie rod actuating the other of said shafts in response to the actuation of said one shaft.

7. A hobby-horse as defined in claim 6 further characterized by pulleys secured to each side of the head of the horse and simulating a bit, said reins extending from the levers through the pulleys and back toward the central portion of the body of the horse.

8. A hobby-horse comprising a body, a pair of front and rear legs for the body, a pair of parallel horizontal members interconnecting the front legs adjacent their top and a second pair of parallel members similarly interconnecting the rear legs, openings in the body through which the parallel members extend, each of said members serving as a fulcrum for pivotal movement of the front and rear legs toward and away from each other, means forming part of the openings for confining movement of the members to rotational movement about their center lines when each serves as a fulcrum for piovtal movement of the legs, and actuating means disposed in the body for pivoting said legs about their fulcrums and changing the fulcrums from one member to another.

9. A hobby-horse as defined in claim 8 further characterized by means connected to the legs and disposed in the openings for limiting the extent of pivotal movement for each of the front and rear pairs of legs.

10. A hobby-horse comprising a body, a pair of front and rear legs for the body, a pair of parallel horizontal members interconnecting the legs of at least one pair adjacent their top, openings in the body through which the parallel members extend, each of said members serving as a fulcrum for pivotal movement of the connected pair of legs toward and away from the other pair, means forming part of the openings for confining movement of the members to rotational movement about their center lines when each serves as a fulcrum for pivotal movement of the connected pair of legs, and actuating means disposed in the body for pivoting the connected pair of legs about their fulcrums and changing the fulcrum from one member to the other.

References Cited in the file of this patent

UNITED STATES PATENTS

| 1,269,490 | Murray et al. | June 11, 1918 |
| 1,708,090 | Hague | Apr. 9, 1929 |

FOREIGN PATENTS

| 949,387 | France | Feb. 14, 1949 |